US005467282A

United States Patent [19]
Dennis

[11] Patent Number: 5,467,282
[45] Date of Patent: * Nov. 14, 1995

[54] GPS AND SATELLITE NAVIGATION SYSTEM

[76] Inventor: Arthur R. Dennis, 2624 Rose Hill Dr., League City, Tex. 77573-4492

[ * ] Notice: The portion of the term of this patent subsequent to Nov. 15, 2011, has been disclaimed.

[21] Appl. No.: 293,735

[22] Filed: Aug. 19, 1994

Related U.S. Application Data

[63] Continuation of Ser. No. 763,379, Sep. 20, 1991, Pat. No. 5,365,447.

[51] Int. Cl.$^6$ .................................................. H04B 7/185
[52] U.S. Cl. ........................ 364/449; 342/352; 342/356; 342/357
[58] Field of Search .................................. 364/443, 449; 342/357, 356, 352

[56] References Cited

U.S. PATENT DOCUMENTS

| | | | |
|---|---|---|---|
| 4,652,884 | 3/1987 | Starker | 342/357 |
| 4,751,512 | 6/1988 | Longaker | 342/357 |
| 4,812,991 | 3/1989 | Hatch | 364/449 |
| 4,876,550 | 10/1989 | Kelly | 342/451 |
| 4,879,713 | 11/1989 | Ichiyoshi | 342/357 |
| 5,365,447 | 11/1994 | Dennis | 364/449 |

FOREIGN PATENT DOCUMENTS 2180426  9/1989  United Kingdom .

OTHER PUBLICATIONS

Paul Massatt and Karl Rudnick, "Geometric Formulas for Dilution of Precision Calculations", *Journal of The Institute of Navigation*, vol. 37, No. 4, pp. 379–391, published in Los Angeles, California, Dec. 1989.

A. R. Dennis, "Special Methods for Using GPS in the Offshore Industry", 12 pages, paper presented at ION GPS–89, Colorado Springs, Colorado, Sep. 27–29, 1989.

Offshore Navigation, Inc., Report on IDGPS Demonstration, 17 pages, published in Houston, Texas, Oct. 1990.

A. R. Dennis, "STARFIX—A New High–Precision Satellite Positioning System", 9 pages, presented at International Symposium on Marine Positioning: INSMAP 86 in Reston, Virginia on Oct. 14–17, 1986.

A. R. Dennis, "New Satellite Positioning System in Operation for Civilian Marine Use", 3 pages, published in Sea Technology in Houston, Texas in Sep., 1986.

Rudy Lambert, "Integrating Differential GPS for Higher 3–D Seismic Survey Accuracy", pp. 35–36, 38, Mar. 1992 issue of *Sea Technology*.

Kim Cassis, "STARS—The Second Part of Houston", pp. 24–26, 31–32 in Feb., 1992 issue of DBA.

Interavia, *Space Directory 1990–1991*, pp. 179–181, 395, 405–407, 410–412, published in 1990.

*Primary Examiner*—Kevin J. Teska
*Assistant Examiner*—Tyrone Walker
*Attorney, Agent, or Firm*—Vaden, Eickenroht, Thompson & Feather

[57] ABSTRACT

A satellite-based navigation system providing improved accuracy and reliability over wide geographical areas, including remote regions, is disclosed. Ranging-type signals transmitted through two or more commercial geostationary telecommunication satellites are received at known reference locations where navigation and correction information is generated and transmitted back to remote users. At the same time, the reference stations receive signals from the Global Positioning System (GPS), generate corrections for the GPS measurements, then transmit these corrections to the remote user. The remote user receives all of this information plus direct measurements from both the GPS and the geostationary satellites and, using conditional error processing techniques, provides a position solution whose accuracy and reliability exceeds that of GPS alone. Alternatively, integrated carrier phase data can be substituted for pseudoranges obtained from the geostationary satellite transmissions.

40 Claims, 5 Drawing Sheets

GPS AND SATELLITE NAVIGATION SYSTEM

BACKGROUND OF THE INVENTION

This application is a continuation of my application U.S. Ser. No. 07/763,379 by the same title filed Sep. 20, 1991, now U.S. Pat. No. 5,365,447, which I claim the benefit of an earlier effective filing date.

FIELD OF THE INVENTION

This invention pertains to navigation and positioning systems. More particularly, this invention pertains to a positioning system incorporating navigational satellites, and sometimes fixed relays, in conjunction with a new calibration and processing system to minimize error and obtain more accurate positional coordinates than is possible under current systems.

DESCRIPTION OF THE PRIOR ART

Navigation by satellite began with the introduction of the U.S. Navy's TRANSIT system in the mid 1960's which is still in use. This system consists of seven polar-orbiting satellites at low-earth altitudes and can provide 20–50 m accuracy. The spread of the satellite orbits allows only one satellite to pass over a given geographic location at a time. Each satellite transmits a beacon-type signal that is received and converted into positional coordinates by analyzing the Doppler effect exhibited by the received signal plus additional navigational information (i.e., the actual satellite positions) transmitted to the TRANSIT user from another source.

A TRANSIT user typically computes a position fix only after each overhead pass is complete, which nominally occurs once every one and one-half hours. The TRANSIT system consequently cannot provide continuous navigational information and only allows the user to update another system, such as dead-reckoning, that provides continuous information. Technical constraints also make the system unusable for vehicles moving at high-speeds.

The United States Government began implementing the next-generation Global Positioning System (GPS) in the late 1970's to provide continuous updates and to service high speed vehicles. GPS employs satellites in 11,000 mile inclined circular orbits spaced 200 Km, 55° apart and will provide a user with continuous coverage anywhere on Earth once the full constellation of satellites is properly placed in orbit. The orbits and operating parameters of GPS satellites are well known to those of ordinary skill in the art and are readily available to the public through various sources. One such reference is the *Interavia Space Directory* (1990–1991) available from Jane's Information Group and another is the *World Satellite Almanac* (2d Ed.) authored by Mark Long and published by Howard N. Sams & Co.

Each GPS satellite transmits an encrypted signal for military use and a degraded, unencrypted signal for civilian use. GPS satellites continuously broadcast these signals and they may be received by anyone with the proper equipment. These carrier signals are superimposed with the respective broadcasting satellite's ephemeris identifying the satellite's precise location. The ephemeris must then be determined from the content of the GPS signal by the user's software in addition to the three dimensions of position. GPS operates on the principle of multilateration wherein a user determines the intersection of a plurality of range measurements derived from the GPS signals, the range measurements being made simultaneously to separate GPS satellites. The user then ascertains from this intersection his instantaneous latitude, longitude, and altitude.

The range measurements inherently contain an error called an offset bias common to all the measurements created by the unsynchronized operation of the satellite and user clocks. This error will yield an erroneous range measurement, making it appear that the user is either closer to or farther from each of the satellites than is actually the case. These measurements are therefore more accurately termed pseudoranges. Four or more measurements are therefore required to ascertain the unknown latitude, longitude, altitude, and offset bias required since the measurements are not truly ranges but are instead pseudoranges obtained from the signals of the respective GPS satellites.

GPS has some serious shortcomings, especially for continuous coverage with five meter accuracy, resulting from several factors. Physical factors include uncertainty in (1) atmospheric propagation delays, (2) precise GPS satellite locations, (which are required to determine a fix), and (3) the accuracy of the timing information that provides the basis of the pseudoranges. Induced errors include intentional degradation by the United States Department of Defense of the unencrypted signal for civilian users, from approximately 25 m accuracy to 100 m accuracy or worse for national security reasons. The best currently available techniques for overcoming this error can only reduce it to about 15 m.

One way of reducing the effects of the error in GPS produced by these factors utilizes differential corrections for the pseudoranges measured by the user to eliminate common errors, namely offset biases. Differential corrections are determined by placing a GPS receiver at a precisely known, fixed reference site, and then measuring the actual errors by comparing the received pseudoranges with the values expected for the known reference site. The differences between the received and expected values are then transmitted to users over a separate communication link to correct their pseudorange measurements before the user's position, i.e., the "fix", is computed.

However, some fix errors are residual and cannot be totally compensated for by differential correction. For example, atmospheric propagation delay errors and satellite position errors will vary as the distance from the reference site increases and therefore will not be common to all measurements. A method for reducing the sensitivity of the user fix computation to residual error must also be employed in addition to differential correction.

Sensitivity to residual error depends on the satellite locations with respect to the user's location and the consequent mathematical relationship between basic pseudorange measurement errors and the position computation. This mathematical relationship is called the "Position Dilution of Precision" (PDOP) and its existence and affect are well known to those of ordinary skill in the art. One treatment of the topic may be found in the publication "Geometric Formulas for Dilution of Precision Calculations", authored by Paul Messett and Karl Rudnick, and published in Vol. 37, No. 4 at page 379 of the *Journal of the Institute of Navigation*. PDOP is a primarily scaler multiplier that allows the user to estimate fix uncertainty for a given measurement uncertainty. For example, if the measurement error is ±10 meters and the PDOP is 3, the user can expect a fix error (i.e., error in calculated position) of ±30 meters in a statistical sense.

GPS satellite locations are constantly changing as the satellites move across the sky and so the PDOP also constantly changes regardless of whether the user is stationary. Minimum PDOP occurs when all satellites are uniformly distributed across the sky seen by the user but this does not occur all the time. Users sometimes experience very large PDOP, especially when the satellites become "grouped together", and fix errors correspondingly fluctuate.

There have been previous attempts to reduce PDOP or otherwise improve the accuracy of GPS-based positioning for remote moving users. U.S. Pat. No. 4,812,991 discloses a technique in which assorted GPS measurements are combined in a prescribed manner to reduce the effect of measurement errors. This technique does not reduce the effective PDOP governing the relationship between measurement errors and fix errors or extend the useful coverage of GPS as does the present invention.

U.S. Pat. No. 4,876,550 describes another data processing method which, although not specifically directed at GPS-based positioning, could be used to reduce the effect of nearly-singular geometry (large PDOP) on position fix computations. This method also does not reduce the typical effective PDOP but instead is applicable when the PDOP is so high that it is essentially infinitely large. This is not generally applicable to GPS which is designed to provide reasonable PDOP at all times although the PDOP will still be too large for accurate positioning because of measurement errors.

Alternative geostationary satellite-based systems have been proposed in order to minimize dependence on GPS with its attendant problems. These systems exhibit large latitudinal PDOP because all of the satellites necessarily reside in the earth's equatorial plane. The relatively large PDOP can magnify small errors in height calculation or instrument calibration to cause large latitudinal position errors. The achievable accuracy from these systems does not meet all needs but the coverage they provide is ideal since the satellites are always in view.

Some approaches have also attempted to use privately developed shore-based navigation systems. These systems can be very accurate but are affected by atmospheric variations, even to the extent that some longer range systems are unstable at night. Also, the construction and maintenance of shore based stations may be logistically or politically unfeasible in many parts of the world.

For some critical applications such as public safety and energy exploration, large increases in PDOP are intolerable. Occurrence of PDOP variations caused by changing satellite position can be reduced, as can PDOP itself, by integrating GPS measurements with those made to one or more commercial geostationary communication satellites. Since these geostationary satellites are earth-stationary, their effective PDOPs are virtually constant. Thus, when measurements from geostationary satellites are combined with those from GPS, the overall PDOP is "smoothed out" and large latitudinal errors inherent in geostationary satellite systems can be eliminated.

A system is described in United Kingdom Patent No. 2,180,426 that combines GPS with a geostationary communication satellite to provide a combined navigation/communication capability. A GPS-like signal is transmitted from the communication satellite, presumably for navigational purposes. However, the requirement to synchronize the clock of this signal to the GPS clock is virtually impossible to realize because of circuit delays and other transponder limitations found in commercial communication satellites. No description of how the combined positioning would be accomplished is provided even if satisfactory timing could be realized (e.g., how the location of the communication satellite derived). The concept is unworkable as described.

An intrinsic calibration problem arises when combining GPS and geostationary-based measurement. Unlike GPS where the carrier frequencies are all the same, geostationary satellite signals pass through different receiver and transponder circuits which necessarily create different time delays thereby introducing instrumental biases. These instrumental biases are difficult to determine for a moving user because each received signal has a different frequency requiring separate receiving and processing channels so that switching channels is impractical.

This calibration problem renders the usual software solution for determining common measurement delays applied to GPS signals ineffective. Although instrumental biases can be minimized through instrumentation calibration, they may change at any time afterwards due to environmental factors and dynamic effects for moving users. A new method must be found to eliminate instrumental biases in geostationary satellite measurements in real-time.

A separate approach to improving GPS accuracy incorporates the integrated carrier phase ("ICP") of GPS signals. The ICP is automatically determined and output by some commercially available GPS receivers as are the GPS pseudoranges. GPS receivers determine the ICP by integrating the difference between the GPS signal frequency and the receiver's local oscillator frequency over a predetermined time. As is the case with any integration, the constant of integration remains undefined and must be determined through other means. The constant of integration is therefore called an "ambiguity" and, more importantly, introduces an unknown bias or error in the determination of positional coordinates.

The problem of ambiguity determination has largely been solved for stationary users using classical interferometric-type techniques similar to those used in astronomy, wherein two or more earth-fixed observers make measurements to the same point source in the sky. Such techniques utilize the motion of the GPS satellites relative to the Earth to separate out effects which remain constant during such motion. The methods all involve searching a multi-dimensional volume of integer ambiguities until a set is found which gives the smallest and most consistent baseline solution residuals over the observation interval. For ICP data from properly-designed receivers, such a minimum closure is indicative of an ambiguity-free solution. The longer the observation interval, the more reliable the solution becomes.

Many attempts have been and are being made to adapt this technique for non-stationary baselines, i.e. for users which are moving absolutely and relatively to each other. All these have been only partially successful for the following reasons:

Motion adds noise and errors which tend to obscure the minimum closure mentioned above, thus making it difficult to achieve the desired solution.

The size of the integer volume to be searched depends upon the errors in an initial "best guess" of the actual position. For stationary users, the initial guess can simply be the last best solution before the signal dropout. For a moving baseline, the positions can drastically change during signal dropout so that initial position errors can get very high. If they should be larger than specified, either no solution or a solution based on the wrong set of integers is highly likely to result.

If the initial solution is based on a pseudorange-only fix, errors such as those due to multipath and atmospheric effects can also inflate initial errors beyond the expected levels.

The computational burden is much higher for moving users than for stationary users due to number of positional unknown parameters that must be determined in addition to the integer ambiguities.

If the size of the search volume is increased to try and overcome the initial errors, the computational burden as well as the time it takes to realize a solution expands exponentially and can quickly become impractical for the moving user.

"Cycle-slip" errors (due to the receiver losing carrier lock temporarily) are very hard to detect in real-time using this method.

These interferometric techniques are common knowledge in the art, yielding results superior to the 100 m accuracy otherwise available from GPS. Several publications detailing these methods are available to the general public. These approaches are fundamentally limited, however, since the user must be stationary. Furthermore, the interferometric techniques cannot be employed in real-time applications since they can only be applied after the fact.

The art therefore currently suffers from two problems depending on which approach is used: either (1) pseudoranges measured from GPS signals are differentially corrected and residual errors are not adequately eliminated, or (2) pseudoranges measured from GPS signals are differentially corrected but not in real-time. Either alternative consequently presents serious drawbacks for many navigational and positional applications.

It is therefore a feature of this invention that it provides accurate positional coordinates relatively free of residual errors for real-time applications.

It is a feature of this invention that it reduces PDOP variations in obtaining positional coordinates.

It is a further feature of this invention that it minimizes the affect of PDOP in obtaining measurements.

It is a still further feature of this invention that it both compensates for unequal instrument delays and determines and eliminates residual error in the measured data in real time.

It is another feature of this invention that it detects and eliminates instrument biases and residual errors using the entire measurement data set.

It is still another feature of this invention that it employs a unique statistically oriented method for detecting and eliminating error in the data set.

It is a further feature of this invention that it integrates navigational satellite data with geostationary satellite data to obtain more accurate positional coordinates.

It is yet another feature of this invention that it provides positional coordinates that are more accurate than can be obtained from conventional techniques.

It is a further feature of this invention that it relies primarily on existing satellite and telecommunication hardware to reduce the cost of implementing the system.

SUMMARY OF THE INVENTION

This invention improves the accuracy and reliability of satellite-based navigation by combining in its first preferred embodiment measurements derived from navigational and commercial geostationary satellite systems in the position computation. Differential corrections are determined for both navigational and geostationary satellite signals and transmitted to the user. The use of geostationary satellites provides enhanced coverage and accuracy over the use of GPS alone since the signals emanate from stationary points rather than from moving satellites that rise and fall. The GPS satellite measurements increase positioning accuracy since they afford better spatial geometry.

The measurements are then combined by the user employing a unique method that improves error detection and removal as compared with previously used techniques. In an alternative embodiment, signals transmitted from land-based radionavigation towers may be substituted for the geostationary satellite signals. In yet another alternative embodiment, the signals transmitted from fixed relays such as geostationary satellites and radionavigation towers with integrated carrier phase data derivable from the GPS transmitted signals to reduce signal processing in both complexity and amount.

BRIEF DESCRIPTION OF THE DRAWINGS

A more particular description of the invention briefly summarized above may be had by reference to the exemplary preferred embodiments illustrated in the drawings of this specification so that the manner in which the above cited features, as well as others which will become apparent, are obtained and can be understood in detail. The drawings nevertheless illustrate only typical, preferred embodiments of the invention and are not to be considered limiting of its scope as the invention may admit to other equally effective embodiments.

In the Drawings.

DESCRIPTION OF THE PREFERRED EMBODIMENTS

Figure 1:
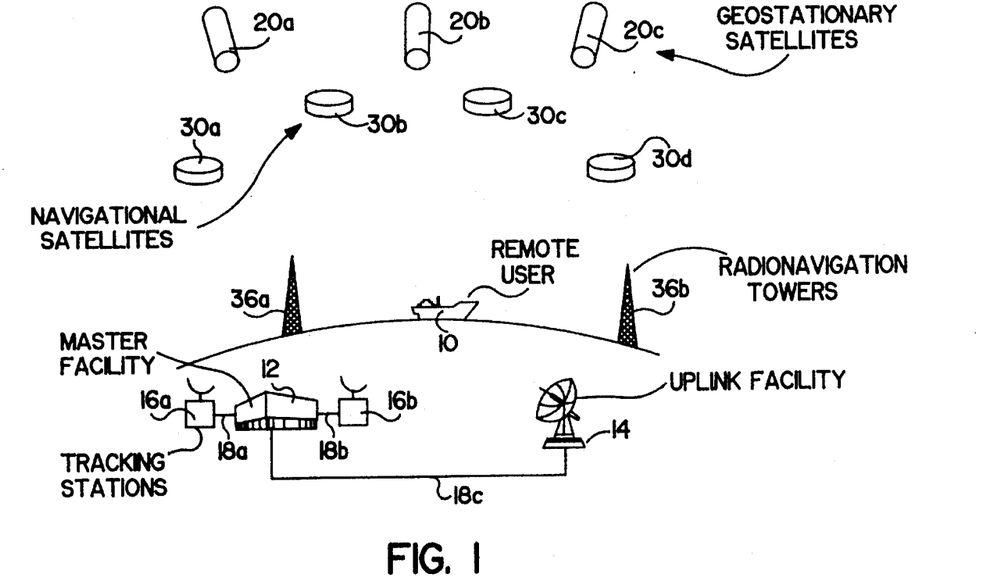
FIG. 1 illustrates the major components of the preferred embodiments.

Most of the major components of the present invention are illustrated in FIG. 1. Remote user 10 is located at some uncertain position and may be relatively rapidly moving. Remote user 10 has at least one geostationary satellite signal receiver 40 as is diagrammed in FIG. 4 and at least one GPS Signal receiver 50 as is diagrammed in FIG. 5. Remote user 10 receives signals from each of geostationary satellites 20a–c via receiver 40 and from each of navigational satellites 30a–d via receiver 50.

Geostationary telecommunication satellites 20a–c may be any of several types well known to those of ordinary skill in the art whose services are commercially available for lease. Geostationary satellites are in a fixed relationship to a particular location or the earth and consequently operate as "fixed relays" receiving signals and relaying them to a predetermined location. The commercial services of the Galaxy, Westar, Satcom, and Spacenet satellites are all suitable for implementing the present invention.

Telecommunication satellites 20a–c receive and transmit spread spectrum signals modulated with a pseudorandom (PRN) code sequence at prescribed chipping and code repetition rates to prevent interference with other signals within the carrier band. These spread spectrum signals must be authorized common carrier signals duly licensed for transmission and receipt by the appropriate governmental entities. In the United States, this is primarily the Federal Communications Commission (FCC).

Figure 2:
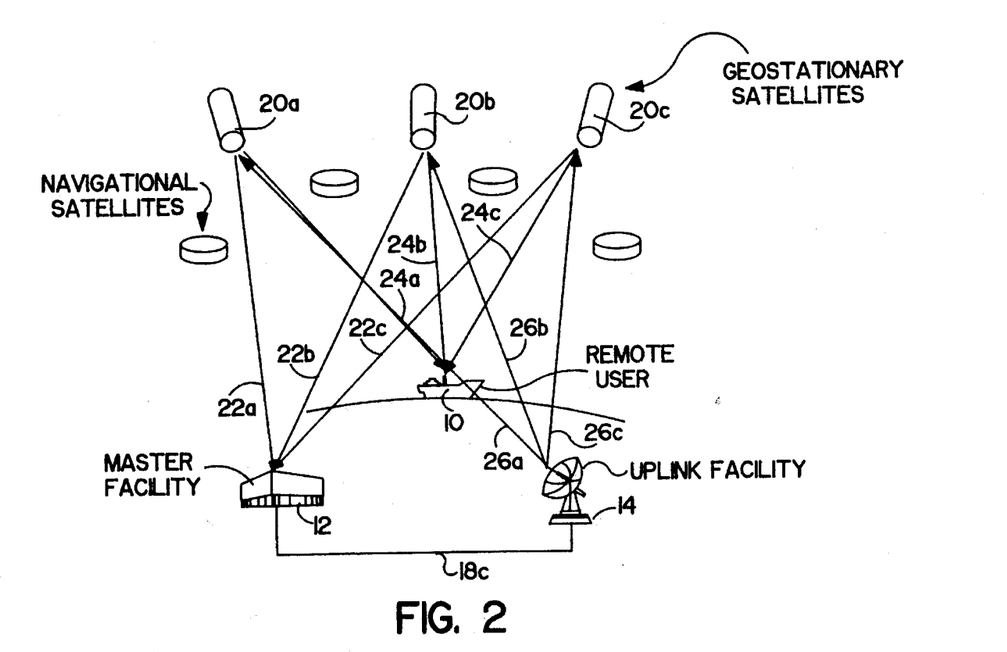
FIG. 2 depicts the use of geostationary communication satellites to comprise a subsystem of fixed relays in accord with the first preferred embodiment of the invention.

Modulation of spread spectrum signals associated with satellites 20a–c includes low frequency biphase modulation of the carrier signal containing information necessary for performing navigational computations aboard remote user 10. The information bandwidth of the signals received and transmitted by geostationary satellites 20a–c in the preferred embodiment of the invention is on the order of 100 Hz. The pseudorandom code sequence chipping rates are typically in the range of 2.5 mHz and code repetition rates are typically in the range of 150 Hz. Satellites 20a–c receive signals from uplink facility 14 and transmit signals to both remote user 10 and master facility 12 as shown in FIG. 2.

Navigational satellites 30a–d in the preferred embodiment are GPS satellites whose operating parameters were discussed in part above. Additionally, the carrier signals from each GPS satellite are modulated with a unique pseudorandom (PRN) code sequence, one at chipping rates of 1.023 mHz and the other at 10.23 mHz. Each carrier signal also contains its respective satellite's ephemeris containing its precise location at any given time.

Master facility 12, uplink facility 14, and tracking stations 16a–b comprise a means for receiving and transmitting signals to and from satellites 30a–d and 20a–c and to remote user 10. Tracking stations 16a–b and uplink facility 14 are linked to master facility 12 via communication links 18a–c, respectively. The means for receiving and transmitting necessarily has a GPS receiver 50 and a geostationary satellite signal receiver 40 (shown in FIGS. 4–5), generally located at master control facility 12, for receiving signals.

Tracking stations 16a–b are representative of a remote tracking network that may be comprised of as many such tracking stations as is required, but all embodiments require at least four tracking stations. Neither the tracking network nor uplink facility 14 need necessarily be in close physical proximity with master control facility 12. It is generally desirable that the tracking network have a high number of tracking stations widely distributed throughout the coverage area.

Master facility 12 coordinates receipt and transmission of the various signals received by and transmitted from tracking stations 16a–b and uplink facility 14 as well as modulation and error correction of data in selected signals as described below. Uplink facility 14 transmits timing-based, modulated, conventional common carrier frequency signals such as C-band or Ku-band signals. This modulation in the preferred embodiment of the invention is a spread spectrum pseudorandom code (PRC) originating in a stable oscillator such as an atomic clock.

One important aspect of the invention is that little or no capital is required to implement the most expensive equipment necessary for the practice of the invention. The GPS satellite system is largely in place and is a project of the United States federal government. The geostationary telecommunications satellites are also in place and their services are readily obtainable along with equipment for receipt, processing and transmission of signals. Access to and use of equipment comprising geostationary satellites 20a–d, master control facility 12, tracking stations 16a–b, communications links 18a–c, and uplink facility 14 can be obtained by contacting a single sales representative at a commercial teleport as may commonly be found in many major metropolitan areas of the United States.

Another important feature is that the receipt, processing and transmission of all signals employs standard spread spectrum signal technology and so can be used with "off-the-shelf" technology. The sole exception is the conditional error processing described below that is performed by the user. Thus, most of the technology for implementing the invention is readily accessible to the public in sources such as *World Satellite Almanac* published by Howard W. Sams & Company and *Spread Spectrum Systems* authored by Robert C. Dixon and published by John Wiley & Sons in addition to commercial teleports and the Interavia *Space Flight Directory* mentioned above.

Receivers 40 and 50 aboard remote user 10 and located at master control facility 12 track the PRC signals generated at uplink facility 14 and, through correlation techniques, generate a signal that accurately tracks the timing provided by uplink facility 14. The output generated by receivers 40 and 50 contains the measured pseudoranges that are proportional to the range from user 10 to the fixed relays and navigational satellites, respectively. These signals also include errors created by offsets between the clocks of uplink facility 14 and remote user 10 as well as propagation errors incurred in the earth's atmosphere and satellite transponders.

Figure 4:
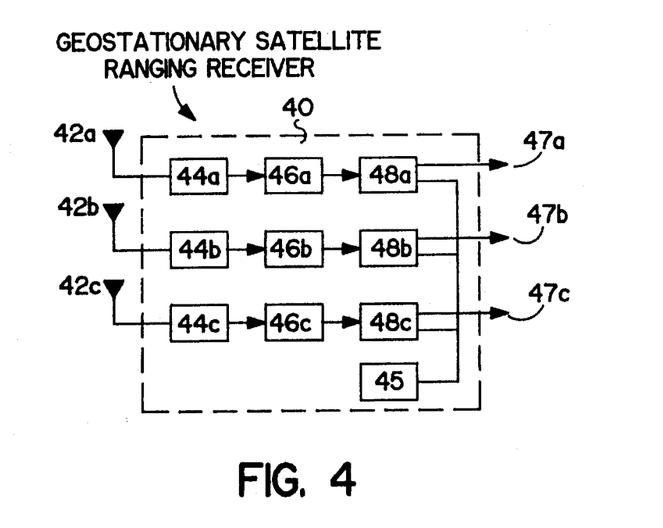
FIG. 4 is a block diagram of a geostationary satellite signal receiver for use with the invention.

The geostationary satellite ranging receiver, generally denoted 40, is illustrated in FIG. 4 in block diagram form. Antennas 42a–c are, in the preferred embodiment, small directional antennas that must be pointed at satellites 20a–c to achieve the highest gain and background signal rejection. Antennas 42a–c receive signals broadcast by each of satellites 20a–c, respectively, which signals are then amplified and converted by RF sections 44a–c, respectively. The PRN code sequence is tracked in code tracking loops 46a–c, respectively, and the code phase is measured in code phase loops 48a–c, respectively, with respect to local oscillator 45.

Outputs 47a–c consist of pseudorange signals transmitted by satellites 20a–c and received by antennas 42a–c, after data receipt and processing. Multiple antennas, channels, and outputs are necessary because each geostationary satellite will typically transmit on different frequencies and will thus necessitate separate circuits for receipt and processing. Receiver 40 will also output data representing the referenced pseudoranges received from master control facility 12 and the position of satellites 20a–c.

Figure 5:
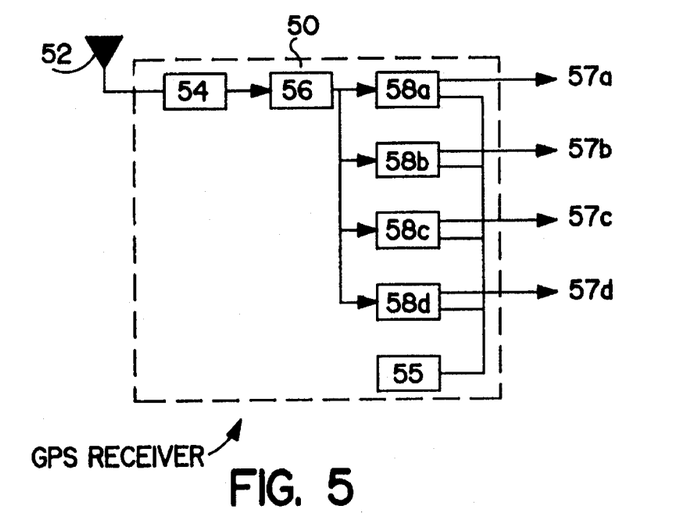
FIG. 5 is a block diagram of a GPS signal receiver for use with the invention.

The GPS receiver of the preferred embodiment of the invention, generally denoted 50, is illustrated in block diagram form in FIG. 5. A single omni-directional antenna 52a, radio frequency amplifier 54a, and code tracking loop 56a are employed because satellites 30a–c transmit on the same frequencies. Code tracking loop 56a then discriminates between signals originating from each of satellites 30a–d by virtue of their unique PRN code sequences and separates them out for transmission to their respective code phase loops 58a–d. Code phase loops 58a–d also compare their respective signals to local oscillator 55 for operational purposes to provide the pseudorange measurements output at 57a–d.

There are commercial products available that may be used to implement receivers 40 and 50 of the invention. Geostationary satellite receiver 40 can be one of many c-band communication receivers capable of handling spread-spectrum downlink signals. The preferred embodiment employs the VSAT receiver manufactured by Contel for their VSAT point-to-multipoint low data rate communications services. GPS receiver 50 similarly may be one of many commercial products, and GPS receivers manufactured by Trimble, Magnavox, and Motorola are preferable and, more particularly, the Motorola ONCORE™ PVT-6 GPS receivers.

Turning to the operation of the geostationary communication satellite subsystem shown in FIG. 2, uplink facility 14 transmits spread spectrum signals via signal paths 26a–c to satellites 20a–c, respectively, in a common carrier, uplink frequency band. Satellites 20a–c then retransmit them as relay signals via signal paths 22a–c, respectively, to master control facility 12 and as relay signals via signal paths 24a–c, respectively, to remote user 10 at different downlink frequencies. The relay signals are received at master control facility 12 and remote user 10 via signal paths 22a–c and 24a–c simultaneously. These relay signals may be of differing carrier frequencies within the downlink carrier frequency band that are modulated with the same pseudorandom code sequences and at the same chipping and code repetition rate.

Tracking stations 16 and 18 are also employed in conjunction with the geostationary satellite subsystem of FIG. 2. Signals are transmitted from uplink facility 14 to satellites 20a–c whereupon they are relayed to tracking stations 16a–b. Tracking stations 16a–b each have at least one receiver 40. Information generated at tracking stations 16a–b is transmitted to master control facility 12 via communication links 18a–b, respectively.

Figure 3:
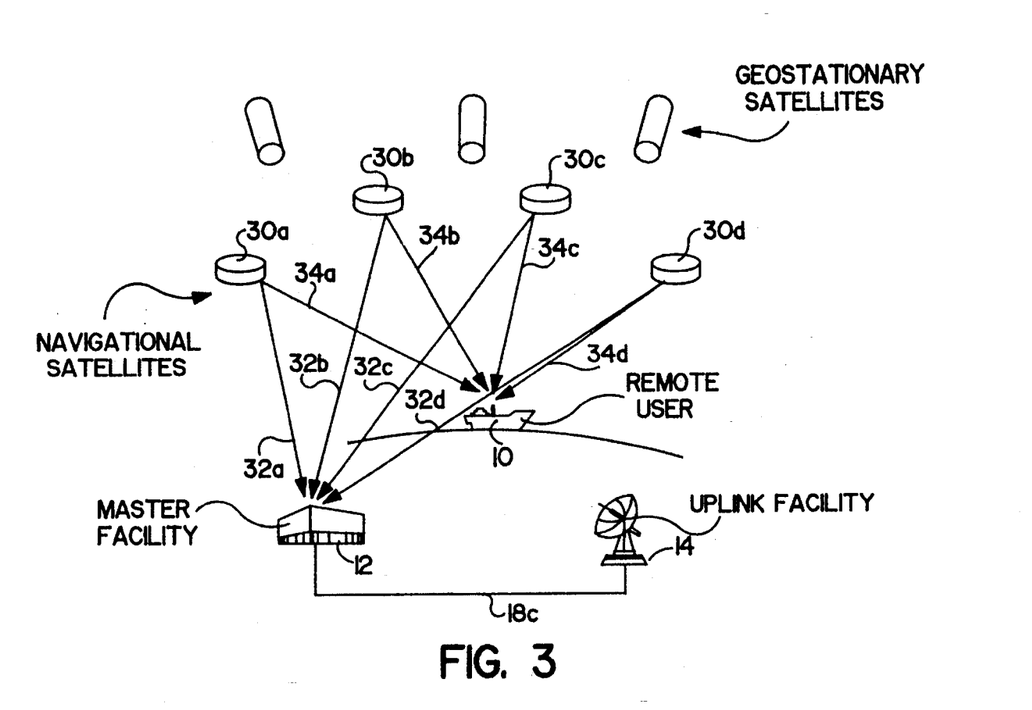
FIG. 3 depicts the use of navigational satellites to comprise a subsystem in accord with both preferred embodiments of the invention.

The operation of the navigational satellite subsystem is illustrated in FIG. 3. Each of satellites 30a–d transmits a signal that is received simultaneously at remote user 10 and master control facility 12 via signal paths 32a–d and 34a–d. As previously mentioned, master control facility 12 has a GPS receiver such as receiver 50 in FIG. 5 that receives the signal broadcast by each of satellites 30a–d to provide pseudorange measurements for each satellite relative to a precisely known antenna location at master control facility 12. Differential corrections to the pseudoranges are then computed to obtain new values for the pseudoranges so that they are accurate at the known location.

These differential corrections are periodically transmitted by master control facility 12 to uplink facility 14 via communication link 18c where they are transmitted to user 10 via telecommunication satellites 20a–c. Remote user 10 then receives those corrections via receiver 40 in FIG. 4 and applies the corrections to his measured pseudoranges obtained from the signal broadcast by satellite 30a–d before processing.

Calibration to eliminate instrumental biases introduced by separate channels in receiver 50 tends to eliminate such biases because each of satellites 30a–d effectively transmits its signal at the same time and at the same frequency. Remote user 10 can compare each of the signals to insure that they exhibit the same delay with respect to the GPS receiver clock 55 and adjust them accordingly utilizing differential correction techniques. Thus the output of any GPS receiver at user 10 master control facility 12 will be largely free of instrumental biases and is self-calibrating in this respect.

Master control facility 12 receives signals relayed from each of geostationary satellites 20a–c and transmitted from navigational satellites 30a–d as previously described. Master control facility 12 has at least one receiver akin to receiver 40 in FIG. 4 and one akin to receiver 50 in FIG. 5 for this purpose. Each receiver generates a pseudorange measurement by measuring the epoch of the received code sequence with respect to an independent oscillator or clock (not shown) at master facility 12. The measurement is a code phase measurement proportional to the range from master facility 12 to the respective satellite but contains an arbitrary offset introduced by the clock of master control facility 12.

Five sets of pseudoranges are generated in the preferred embodiment of this invention:

(1) geostationary satellites 20a–c relative to user 10;

(2) geostationary satellites 20a–c relative to master control facility 12;

(3) geostationary satellites 20a–c relative to tracking stations 16a–b;

(4) navigational satellites 30a–d relative to user 10; and (5) navigational satellites 30a–d relative to master control facility 12.

Once generated, those pseudoranges not generated at user 10 but needed to generate correction data are transmitted to user 10 for use in computing a fix.

The pseudorange measurements with respect to geostationary satellites 20a–c relative to master control facility 12 are made simultaneously, thereby obtaining a set of data represented by Equation 1:

$$Z_M = R_M + D_M + D_U + N_M \quad [1]$$

where $Z_M$=the vector of the measured pseudoranges at master control facility 12;

$R_M$=the vector of ranges from master control facility 12 to the respective geostationary satellites;

$D_M$=the vector of common clock offsets by the clock of master facility 12;

$D_U$=the vector of transponder delays in respective geostationary satellites; and $N_M$=vector of the measured random noise at master control facility 12.

Pseudorange measurements made at master control facility 12 using Eq. 1 are reference pseudorange measurements that are sent to uplink facility 14 via communication link 18c. Uplink facility 14 also has a local clock (not shown) from which the PRN codes are derived, as well as a modulator (also not shown). The modulator of uplink facility 14 accepts the data from master control facility 12 and modulates it onto the uplink carrier signal in a manner well known to those of ordinary skill in the art. The clock of uplink facility 14 does not introduce error or delay and consequently has no bearing on the generation of user measurements, but should nevertheless be stable enough to create slowly varying pseudorange measurements of both master control facility 12 and remote user 10. A carrier signal modulated with the master pseudorange data is then transmitted to remote user 10.

Simultaneously, pseudorange measurements with signals from the geostationary satellites 20a–c are calculated at remote user 10. These measurements can be represented by Eq. 2:

$$Z_U = R_U + D_U + D_U + N_U \qquad [2]$$

where $Z_U$=the vector of measured pseudoranges at remote user 10;

$R_U$=vector of ranges from user 10 to the respective geostationary satellite;

$D_U$=vector of the common clock offsets of the clock at remote user 10;

$D_{UG}$=vector of transponders delays at the respective geostationary satellites; and $N_U$=vector of measurement of random noise at remote user 10.

Transponder delay $D_U$ is common to Eqs. (1) and (2) and can be eliminated by taking their difference to obtain:

$$Z_D = (R_U - R_M) + (D_U - D_M) + (N_U - N_M) \qquad [3]$$

A major source of instrumental bias is thereby eliminated, including all delays and offsets produced at master control facility 12, uplink facility 14, and propagation delays incurred in signal transmission along signal paths associated with satellites 20a–c. This significantly eliminates the need to transmit timing information and overcomes synchronization problems found in the prior art.

Eq. (3) shows that the $Z_D$ is a function of four unknowns: the three cartesian coordinates latitude, longitude, and altitude of user 10's position and the common clock differences offset $(D_U - D_M)$. When using three geostationary satellites as described above, the additional measurement required is the altitude of user 10 measured from a reference datum. This altitude is accurately predictable for most users on the Earth's surface. However, knowing the user's altitude is not a critical requirement of this invention since additional satellite measurements are used as is described elsewhere.

Finally, in order to provide user 10 with the precise locations of geostationary satellites 20a–c as required for Eq. (3), pseudorange measurements of geostationary satellites 20a–c are made with reference to at least four remote tracking stations such as remote tracking stations 16a–b of FIG. 1. The measurements are made by receivers located at these fixed known sites and are transmitted to master control facility 12. Master control facility 12 then computes from pseudorange measurements made at tracking stations 16a–b and those at master control facility 12 to accurately determine the position of each of satellites 20a–c. The positions of satellites 20a–c once calculated are then transmitted via communication link 18c to uplink facility 14 for modulation onto a carrier signal and transmission to remote user 10. Pseudorange data is calculated from signals received from the navigation satellites which take the form of Equations 1–2 above and common pseudoranges errors likewise be eliminated by differentially correcting.

Remote user 10 receives pseudoranges measured at master control facility 12 with respect to geostationary satellites 20a–c, at tracking stations 16a–b with respect to geostationary satellites 20a–c, and at master control facility 12 with respect to navigational satellites 30a–d. User 10 collects these measurements along with the pseudorange measurements made at remote user 10 with respect to geostationary satellites 20a–c and with regard to navigational satellites 30a–d to create a single user data set. This user data set is then separated into subsets.

The first subset contains unknown errors which must be determined from the data and can be considered a trial group. The second subset contains data with much smaller errors relative to the trial group such that it can be considered a control group. The data of both groups is applied to conditional error processing module wherein very accurate estimates of the error in the trial group are determined.

The conditional error process can be explained from a mathematical perspective. Assuming the vector Z to be defined as:

$$Z = HX + V \qquad [5]$$

where

X≡an unknown vector representing the user's location

H≡the linear relationship between X and Z; and

V≡as vector comprised of random errors, the least squares solution for X is:

$$X^* = (H^T H)^{-1} H^T Z, \qquad [6]$$

where $H^T$ is the transposition of H. The residual after the least squares fit is:

$$R = Z - HX^* = (I - H(H^T H)^{-1} H^T) Z = MZ \qquad [7]$$

where I is the identity matrix and M is an idempotent transformation.

The residual vector R is defined by the single user data set comprised of differentially corrected GPS measurements and geostationary satellite measurements. Thus, when the user data set is partitioned into control and trial subsets, this is a partitioning of the vector components of the residual vector R. The differentially corrected GPS measurements are almost always the most accurate because the reference signal is visible both the user's location and at the known reference site. Longitudinal measurements to geostationary satellite such as satellites 20a–c could, however, be substituted as a control group in an alternative, lesser preferred embodiment. The differentially corrected GPS measurement are consequently used as the control group.

The residuals for the control group are assumed to be zero and are used to minimize the residuals for the entire data set based on that assumption. Z* is obtained by accumulating the elements of M in Eq. (7) over a prescribed period of time and then partitioning the accumulated M and culling the submatrices resulting from the control group residuals. Z* then is comprised of "conditional errors" in the trial group measurements and can be applied to the trial group subset (i.e., geostationary satellite measurements) to obtain more accurate measurements and, hence a "fix".

Figure 7:
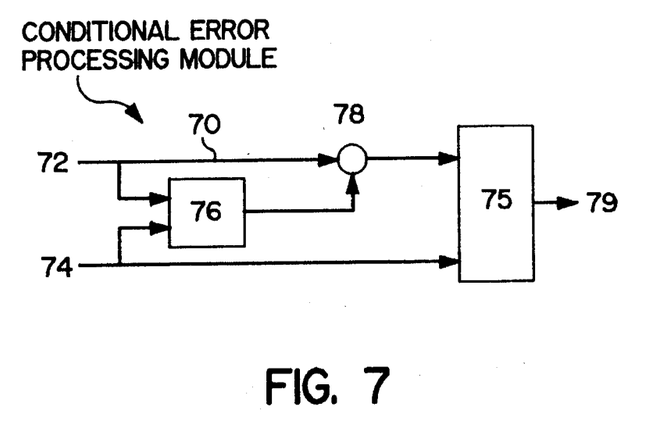
FIG. 7 is a block diagram of the conditional error processor of the preferred embodiment of the invention.
Figure 8:
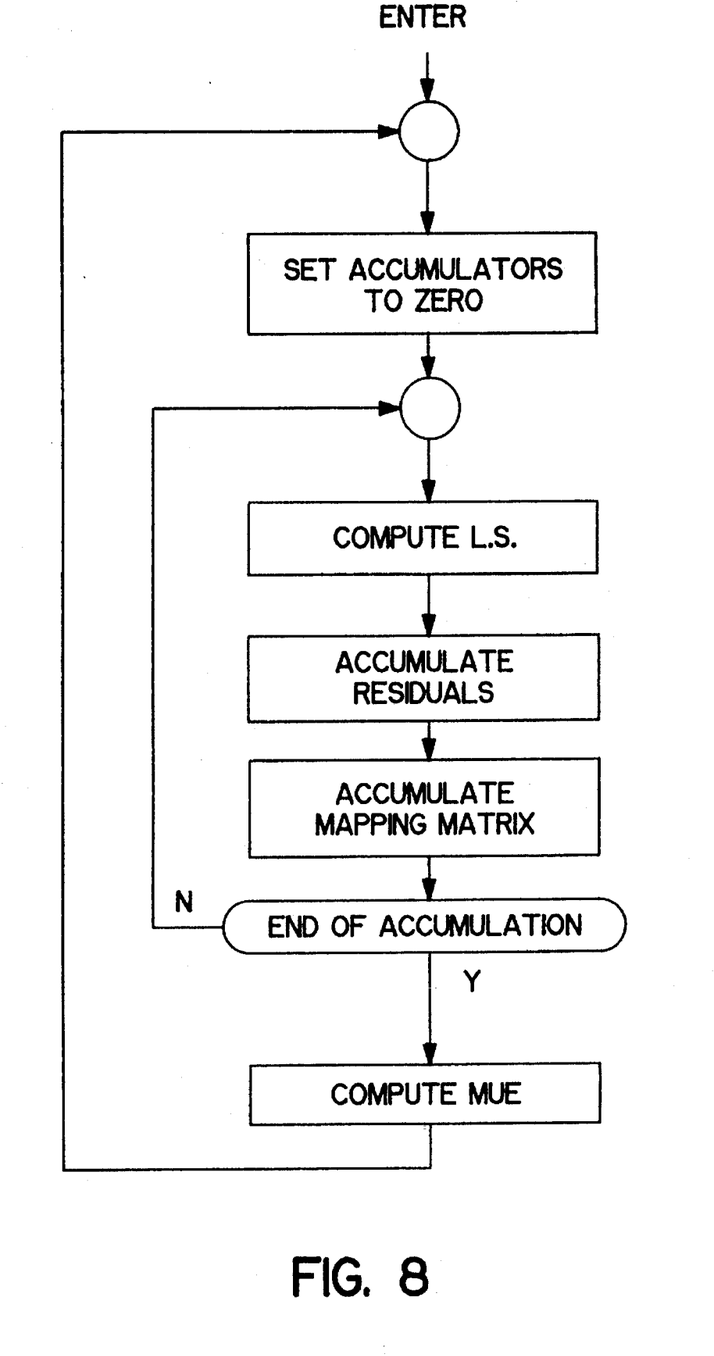
FIG. 8 is a flow diagram of the steps performed by the conditional error processor of FIG. 7.

The conditional error processing module is illustrated in FIG. 7 and the processing algorithm in flow chart form in FIG. 8. Conditional error processor 76 in FIG. 7 receives its input data from both groups, the trial group at input 72 and the control group at input 74. The control group at input 74 in the preferred embodiment is the subset comprised of differentially corrected GPS measurements and the trial group at input 72 is the geostationary satellite measurements. Conditional error processor 76 then zeros out a set of accumulators and begins the iterative process for a predetermined period of time.

The iterative process begins by performing a least squares solution for all measurements including those in both the trial group and the control group. The differences (residuals) between the data in the trial group and the solution are determined from a linear mapping of all data, and the differences are stored and accumulated as a linear mapping of the raw data. The differences between the data in the control group and the solution are assumed to be zero and are also accumulated as a linear mapping. This iterative process in the preferred embodiment is performed for a period of approximately one to two minutes.

At the end of the iterative process, the conditional errors are computed by appropriately partitioning the accumulated linear mappings of raw data so that the differences of the control data are culled, inverting the resulting matrix, and then processing the accumulated residuals to determine the errors in the data of the trial group. The result is a new data set containing "conditional errors" that are applied to the original trial group subject (i.e., geostationary satellite measurements) to minimize the overall residuals. Processing then returns to the next accumulation cycle.

The output of conditional error processor 76 then consists of corrections 78 for the trial data 72. The corrected trial data is then grouped again with the control group data and processed using a conventional standard processor 75. Statistical processor 75 in the preferred embodiment implements a Kalman filter as is well known to those of ordinary skill in the art. Output 79 of statistical processor 75 then consists of accurate positional coordinates as a function of time.

It is an essential characteristic of the conditional error processing that the accuracies of the error estimates must be the highest possible given the total amount of data available to remote user 10. They must be higher, for example, than if a simple comparison was made between the trial and control group of measurements. This is accomplished in conditional error processing by comparing the errors of all data that has been optimally combined via least square fitting procedure thus insuring the results will have to smallest possible statistical uncertainty.

By using the pseudoranges measured at remote control facility 12 with respect to navigational satellites 30a–c as the control group, the uncertainties in the error estimates will be several times less than the readout associated with the measurements in the control group, i.e., the differentially corrected GPS pseudo-ranges alone. Thus, the effects of residual unknown errors in the GPS data will have minimum effect on the accuracy of the error estimate corrections.

Figure 6:
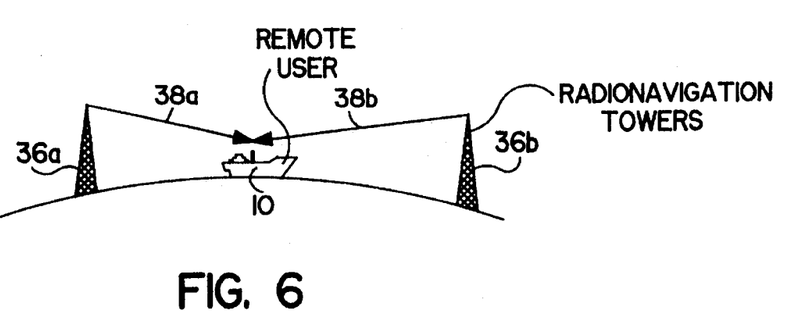
FIG. 6 shows an alternative preferred embodiment employing radionavigation towers rather than geostationary communications satellites.

Geostationary satellites 20a–c function as fixed relays and can be replaced by radio navigation towers 36a–b shown in FIG. 1 in an alternative preferred embodiment. As shown in FIG. 6, radio navigation towers 36a–b transmit signals via signal paths 38a–b to remote user 10 whereupon remote user 10 extracts measurements from the system that are proportional to the range of each shore station. Measurements extracted from signals 38a–b can be represented by Equation 4 below:

$$Z_S = R_S + N_S + B_S \quad [4]$$

where $Z_S$=vector of the measured ranges;

$R_S$=vector of the true ranges to shore stations 36a–b;

$N_S$=measurement noise; and $B_S$=instrumental biases.

Since the exact locations of radio navigation towers 36a–b are known, there are three unknowns and the users coordinate position can be determined therefrom without the need for tracking stations 16a–b or associated measurements. This information is then used along with GPS measurements taken as previously described to establish the single user data set for the conditional error processor.

Figure 10:
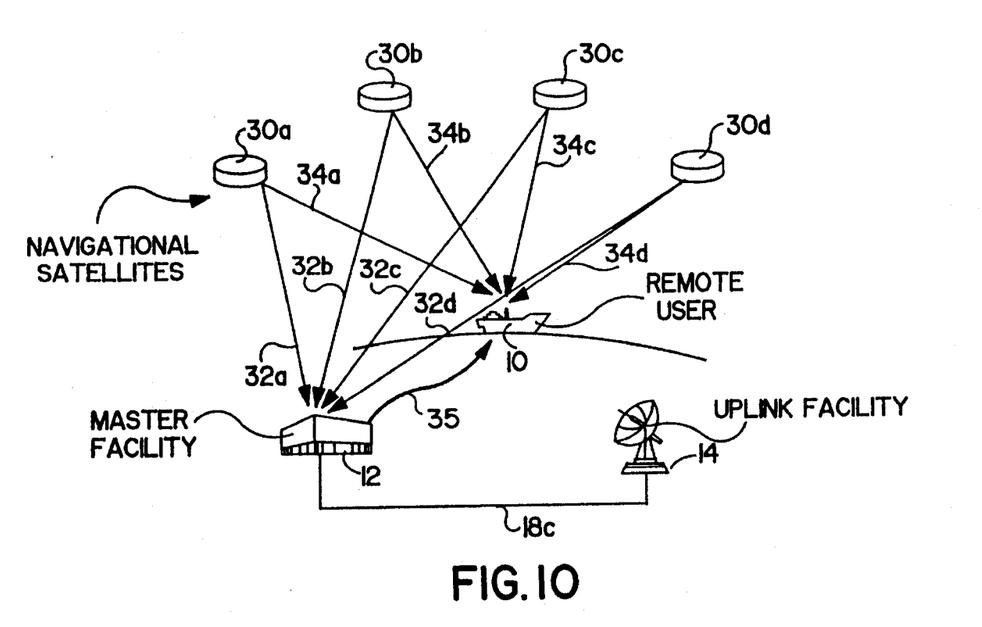
FIG. 10 illustrates an alternative embodiment of the invention in which ICP data rather than pseudoranges from fixed relays is employed.

The GPS pseudoranges may also be differentially corrected using conditional error processor 76 with ICP data rather than pseudoranges calculated from fixed relays. One significant advantage to employing ICP data rather than pseudoranges from fixed relays is reduction in the amount and complexity of signal processing in some applications. One such application is illustrated in FIG. 10 wherein user 10 is sufficiently close to master control facility 12 that pseudoranges and ICP data measured at master control facility 12 can be transmitted directly to user 10. The need for the geostationary satellite subsystem of FIG. 2 is thereby eliminated. Thus, in addition to providing accurate positional coordinates from ICP data for real-time applications, this application of conditional error processor 76 can reduce signal processing relative to other embodiments.

In the application depicted in FIG. 10, only pseudoranges of navigational satellites 30a–d relative to user 10 and master control facility 12 are measured and processed. The geostationary satellite subsystem illustrated and discussed above in connection with FIG. 2 are therefore eliminated. So, too, the signal processing represented by Eqs. [1]–[3] and also discussed above are eliminated. Uplink facility 14, tracking stations 16a–b, and communication links 18a–c are also unnecessary. Using ICP data instead of pseudoranges measured from fixed relays can therefore also reduce cost and complexity of the system while maintaining the increased accuracy provided by conditional error processing.

The operation of the navigational satellite subsystem is illustrated in FIG. 3 and is discussed above. Each of satellites 30a–d transmits a signal received simultaneously at remote user 10 and master control facility 12 via signal paths 32a–d and 34a–d. Master control facility 12 has a GPS receiver such as receiver 50 in FIG. 5 that receives the signal broadcast by each of satellites 30a–d and provides pseudorange measurements for each of satellites 30a–d relative to a precisely known antenna location at master control facility 12 as well as the ICP data for each signal.

Differential corrections to these pseudoranges and ICP data are then computed to obtain new values for the pseudoranges and ICP data so that they are accurate at the known location. These differentially corrected pseudoranges and ICP data are transmitted from master control facility 12 directly to user 10 who receives them via signal path 35 and a receiver 40 (shown in FIG. 4). A receiver 50 at user 10 provides at outputs 57a–d (shown in both FIGS. 5 and 9) pseudoranges of navigational satellites 30a–d relative to user 10 that are not differentially corrected.

Figure 9:
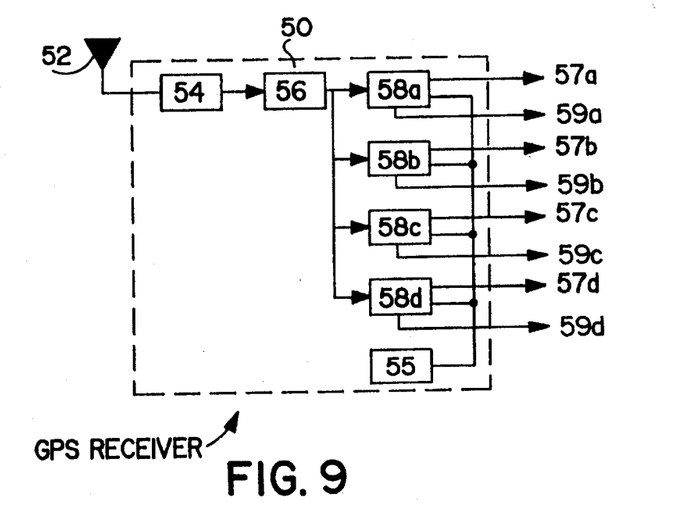
FIG. 9 is a block diagram of the GPS signal receiver of FIG. 5 showing additional features thereof.

As is well known in the art, GPS receivers calculating and outputting GPS pseudoranges also calculate and output the ICP for the GPS carrier signal. Although not shown in FIG. 5, FIG. 9 illustrates GPS receiver 50 outputting both GPS pseudoranges and ICP data, with like parts bearing like numbers. The significant differences between FIGS. 5 and 9 are ICP outputs 59a–d. The ICP data on outputs 59a–d include error attributable to the ambiguity that is the constant of integration skewing all measurements.

As described above, current interferometric techniques for ascertaining the values of this ambiguity prohibit calculation for real-time applications as a practical matter. Like the output of receiver 40 in FIG. 4 and the data on outputs 57a–d of receiver 50 in FIG. 5, the ICP data on outputs 59a–d also contain the residual errors described above. The residual errors can be eliminated using conditional error processor 76 of FIG. 7 as described above.

Such application of conditional error processor 76 could appear to leave unresolved the bias of the constant of integration. Since this ambiguity under the current state of the art must be resolved through interferometric techniques, real-time applications would still be barred where ICP data were employed. However, it has recently been discovered that the constant of integration behaves mathematically as if it were a residual error, and hence can also be eliminated by application of conditional error processor 76 with slight modification.

Inputs 72 and 74 of conditional error processor 76 in FIG. 7 are ICP data obtained from outputs 59*a–d* and pseudorange data, respectively. The user data set that comprised numerous measurements in the embodiment previously discussed comprises only pseudoranges measured from satellites 30*a–d* relative to master control facility 12 and user 10, and ICP data. However, like the embodiment discussed above, this user data set is separated into two subgroups defined as the "trial" and "control" groups.

The ICP data is obtained from receiver 50 as shown in FIG. 9. Pseudorange data comprises data from both the differentially corrected data transmitted to user 10 from master control facility 12 and the data obtained from outputs 57*a–d* of receiver 50. Thus, the ICP data in this application serves as the trial group and the pseudorange data as the control group. The ICP data is chosen for the trial group because, in the parlance of the art, it is "essentially noise-free but containing unknown, constant ambiguities" while the pseudorange data is "noisy but free of ambiguities."

Conditional error processor 76 then processes data received at inputs 72 and 74 in accord with the process described above and charted in FIG. 8. A set of accumulators is set to zero and at each data input time an iteration is performed, the iteration comprising:

(1) a least squares solution for all accumulated data from both the trial and control groups;

(2) the residuals ("differences") between the trial group (ICP data) and the least squares solution are determined from a linear mapping of all data;

(3) the trial group residuals are stored and accumulated as a linear mapping of the same data; and (4) the residuals ("differences") between the control group (GPS pseudoranges) are assumed to be zero and are accumulated as a linear mapping of the raw data.

After all data has been input, the iterative process is complete. As before, the process normally takes 2–3 minutes.

The accumulated linear mappings are then partitioned to cull the residuals of the control data. The resulting matrix is then inverted and the accumulated residuals processed to obtain the conditional errors for the original trial group (ICP data). This processing is accomplished in the preferred embodiment with a Kalman filter as is discussed above. The conditional errors are then applied to the trial group to minimize overall residuals to yield positional coordinates with increased accuracy. Note the differences between conditional error processing described herein and traditional least squares/Kalman filter processing found in the art.

It is therefore evident that the invention claimed herein may be embodied in alternative and equally satisfactory embodiments without departing from the spirit or essential characteristics thereof. For instance, the application illustrated in FIG. 10 can be extrapolated to situations wherein user 10 cannot receive signals directly from master control facility 12. The signals can instead be transmitted through uplink facility 14 and relayed by geostationary satellites 20*a–c* to user 10 as shown in FIG. 2 using techniques discussed therewith. Such an extrapolation will be well within the ordinary skill in art for those having the benefit of this disclosure. The preferred embodiments disclosed above must consequently be considered illustrative and not limiting of the scope of the invention.

What is claimed is:

1. An integrated positioning system, comprising:

a plurality of fixed relays receiving and transmitting a first plurality of signals;

a plurality of navigational satellites transmitting a second plurality of signals;

control means for receiving the first plurality of signals from the fixed relays and the second plurality of signals from the navigational satellites, for modulating the first plurality and the second plurality of signals, and for transmitting the modulated first plurality and the modulated second plurality of signals;

means for receiving the unmodulated first and second pluralities of signals and the modulated first and second pluralities of signals; and means for calibrating and processing the positional data derived from one of the unmodulated first plurality and the unmodulated second plurality of signals received from the control means to minimize errors in data derived from the one unmodulated plurality of signals with data derived from the other of the unmodulated plurality of signals, data derived from the modulated first plurality of signals, and the modulated second plurality of signals to obtain accurate positional coordinates.

2. The integrated positioning system of claim 1, wherein the control means minimizes errors in the data derived from the first plurality of signals.

3. The integrated positioning system of claim 2, wherein the control means minimizes errors by:

segregating the data derived from the first plurality of signals and the data derived from the second plurality of signals into trial and control groups;

performing, for each datum in the trial and control groups, an iteration comprising:

accumulating each datum input after the first datum input with all data previously input;

performing a least-squares fit for all data input;

determining the residuals between the trial group data and the least-squares fit;

assuming the residuals between the control group and the least-squares fit to be zero;

accumulating the trial group residuals and the control group residuals as a linear mapping; and storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group data to obtain accurate positional coordinates.

4. The integrated positioning system of claim 1, wherein the control means minimizes errors by:

segregating the data derived from the first plurality of signals and the data derived from the second plurality of signals into trial and control groups;

performing, for each datum in the trial and control groups, an iteration comprising:

accumulating each datum input after the first datum input with all data previously input;

performing a least-squares fit for all data input;

determining the residuals between the trial group data and the least-squares fit;

assuming the residuals between the control group and the least-squares fit to be zero;

accumulating the trial group residuals and the control group residuals as a linear mapping; and storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group data to obtain accurate positional coordinates.

5. The integrated positioning system of claim 1, wherein the plurality of fixed relays comprises at least one of a geostationary satellite and a radio navigation station.

6. The integrated positioning system of claim 1, wherein at least one of the plurality of navigational satellites is a GPS satellite.

7. The integrated positioning system of claim 1, wherein the control means further comprises:

a tracking network;

an uplink signal transmitter; and a master control facility linked to the tracking network and the uplink signal transmitter.

8. The integrated positioning system of claim 1, wherein the receiving means includes a ranging receiver.

9. The integrated positioning system of claim 8, wherein the receiving means further includes a GPS receiver.

10. The integrated positioning system of claim 1, wherein the receiving means includes a GPS receiver.

11. The integrated positioning system of claim 1, wherein at least one of the first plurality and the second plurality of signals comprises at least one spread spectrum signal.

12. The integrated positioning system of claim 1, wherein the control means modulates the received signals using spread spectrum techniques to include pseudorandom code modulation at preselected chipping and code repetition rates.

13. An integrated positioning system, comprising:

means transmitting a first plurality of signals;

a plurality of fixed relays receiving and transmitting the first plurality of signals;

a plurality of navigational satellites transmitting a second plurality of signals;

control means for receiving and transmitting located at a known position, the control means:

receiving the first plurality of signals relayed by the fixed relays, deriving pseudorange data corrections for the known position relative to the fixed relays, receiving the second plurality of signals, deriving pseudorange data corrections for the known position relative to the navigational satellites, and transmitting the pseudorange data corrections;

first means for receiving the first plurality of signals at an uncertain position and deriving pseudorange data for the uncertain position relative to the fixed relays;

second means for receiving the second plurality of signals at the uncertain position and deriving pseudorange data for the uncertain position relative to the navigational satellites;

means for computing the accurate coordinates of the uncertain position, the computing means:

receiving the pseudorange data corrections transmitted by the control means;

applying the pseudorange data corrections to the pseudorange data of the uncertain position relative to the fixed relays and the pseudorange data of the uncertain position relative to the navigational satellites; and minimizing the error the pseudorange data of the uncertain position relative to at least one of the fixed relays and the navigational satellites with the pseudorange data of the uncertain position relative to the other of the fixed relays and the navigational satellites.

14. The integrated positioning system of claim 13, wherein the computing means minimizes errors in the pseudorange data of the uncertain position relative to the fixed relays.

15. The integrated positioning system of claim 14, wherein the computing means minimizes errors by:

segregating the pseudorange data into trial and control groups;

performing, for each datum in the trial and control groups, an iteration comprising:

accumulating each datum input after the first datum input with all data previously input;

performing a least-squares fit for all data input;

determining the residuals between the trial group data and the least-squares fit;

assuming the residuals between the control group and the least-squares fit to be zero;

accumulating the trial group residuals and the control group residuals as a linear mapping; and storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group data to obtain accurate positional coordinates.

16. The integrated positioning system of claim 13, wherein the computing means minimizes errors by:

segregating the pseudorange data into trial and control groups;

performing, for each datum in the trial and control groups, an iteration comprising:

accumulating each datum input after the first datum input with all data previously input;

performing a least-squares fit for all data input;

determining the residuals between the trial group data and the least-squares fit;

assuming the residuals between the control group and the least-squares fit to be zero;

accumulating the trial group residuals and the control group residuals as a linear mapping; and storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group data to obtain accurate positional coordinates.

17. The integrated positioning system of claim 13, wherein the plurality of fixed relays comprises at least one of a geostationary satellite and a radio navigation tower.

18. The integrated positioning system of claim 13, wherein at least one of the navigational satellites is a GPS satellite.

19. The integrated positioning system of claim 13, wherein the control means includes a tracking station located at a second known position.

20. The integrated positioning system of claim 19, wherein the tracking station receives the first plurality of signals, the control means derives corrections to the pseudorange data relative to the second known location, and the control means transmits the corrections.

21. The integrated positioning system of claim 13, wherein the computing means minimizes the error of the pseudorange data of the uncertain position relative to the navigational satellites.

22. The integrated positioning system of claim 13, wherein the control means modulates the received signals using spread spectrum techniques to include pseudorandom code modulation at preselected chipping and code repetition rates.

23. An integrated positioning system, comprising:

a plurality of navigational satellites transmitting a plurality of signals;

first means for receiving the plurality of signals, the first receiving means being located at an uncertain position, deriving pseudorange data for the uncertain position relative to the navigational satellites, and deriving integrated carrier phase data for the plurality of signals;

second means for receiving the plurality of signals from the navigational satellites, the receiving means being located at a known position, deriving pseudorange data for the known position relative to the navigational satellites, deriving integrated carrier phase data for the plurality of signals, and transmitting the pseudorange data and the integrated carrier phase data for the known position;

third means for receiving pseudorange data transmitted from the second receiving means; and computational means for calibrating and processing the pseudorange data derived by the first means, the integrated carrier phase data derived by the first means, and the pseudorange data received by the third means to minimize errors in the pseudorange data derived by the first means with the integrated carrier phase data derived by the first means and the pseudorange data received by the third means and obtain accurate positional coordinates.

24. The integrated positioning system of claim 23, wherein the control means minimizes errors in the pseudorange data of the uncertain position relative to the navigational satellites.

25. The integrated positioning system of claim 24, wherein the control means minimizes errors by:

segregating the data derived from the pseudorange data into trial and control groups;

performing, for each datum in the trial and control groups, an iteration comprising:

accumulating each datum input after the first datum input with all data previously input;

performing a least-squares fit for all data input;

determining the residuals between the trial group data and the least-squares fit;

assuming the residuals between the control group and the least-squares fit to be zero;

accumulating the trial group residuals and the control group residuals as a linear mapping; and storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group data to obtain accurate positional coordinates.

26. The integrated positioning system of claim 23, wherein the control means minimizes errors by:

segregating the pseudorange data into trial and control groups;

performing, for each datum in the trial and control groups, an iteration comprising:

accumulating each datum input after the first datum input with all data previously input;

performing a least-squares fit for all data input;

determining the residuals between the trial group data and the least-squares fit;

assuming the residuals between the control group and the least-squares fit to be zero;

accumulating the trial group residuals and the control group residuals as a linear mapping; and storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group data to obtain accurate positional coordinates.

27. The integrated positioning system of claim 23, wherein at least one of the navigational satellites is a GPS satellite.

28. The integrated positioning system of claim 23, wherein the control means includes a tracking station located at a second known position.

29. The integrated positioning system of claim 28, wherein the tracking station receives the first plurality of signals, the control means derives corrections to the pseudorange data relative to the second known location, and the control means transmits the corrections.

30. The integrated positioning system of claim 23, wherein the control means modulates the received signals using spread spectrum techniques to include pseudorandom code modulation at preselected chipping and code repetition rates.

31. A method for obtaining positional coordinates comprising the steps of:

obtaining positioning data for a known position relative to a plurality of fixed relays and for an uncertain position relative to a plurality of navigational satellites;

segregating the positioning data into trial and control groups;

performing, for each datum in the trial and control groups, an iteration comprising:
- accumulating each datum input after the first datum input with all data previously input;
- performing a least-squares fit for all data input;
- determining the residuals between the trial group data and the least-squares fit;
- assuming the residuals between the control group and the least-squares fit to be zero;
- accumulating the trial group residuals and the control group residuals as a linear mapping; and
- storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group positioning data to obtain accurate positional coordinates.

32. The method of claim 31, wherein the control group comprises pseudorange data for an uncertain position relative to the fixed relays.

33. The method of claim 32, wherein the plurality of fixed relays comprises at least one of a geostationary satellite and a radio navigation tower.

34. The method of claim 32, wherein the plurality of navigational satellites comprises a GPS satellite.

35. The method of claim 31, wherein the plurality of fixed relays comprises at least one of a geostationary satellite and a radio navigation tower.

36. The method of claim 31, wherein the plurality of navigational satellites comprises a GPS satellite.

37. The method of claim 31, wherein the step of processing the control group residuals to obtain conditional errors is implemented with a Kalman filter.

38. A method for obtaining positional coordinates comprising the steps of:

obtaining positioning data and integrated carrier phase data for an uncertain position relative to a plurality of navigational satellites;

segregating the positioning data and the integrated carrier phase data into trial and control groups;

performing, for each datum in the trial and control groups, an iteration comprising:
- accumulating each datum input after the first datum input with all data previously input;
- performing a least-squares fit for all data input;
- determining the residuals between the trial group data and the least-squares fit;
- assuming the residuals between the control group and the least-squares fit to be zero;
- accumulating the trial group residuals and the control group residuals as a linear mapping; and
- storing the linear mapping;

partitioning the linear mappings to segregate the control group residuals from the trial group residuals;

inverting the matrix of trial group residuals resulting from the partitioning;

processing the control group residuals to obtain the conditional errors; and applying the conditional errors to correct the trial groups errors;

applying the corrected trial group errors to the trial group positioning data to obtain accurate positional coordinates.

39. The method of claim 38, wherein the plurality of navigational satellites comprises a GPS satellite.

40. The method of claim 38, wherein the step of processing the control group residuals to obtain conditional errors is implemented with a Kalman filter.

* * * * *